(12) United States Patent
Schmidt et al.

(10) Patent No.: US 10,138,631 B2
(45) Date of Patent: Nov. 27, 2018

(54) ROOFING SYSTEMS AND METHODS

(71) Applicant: Spray Tech Industries, LLC, Horton, AL (US)

(72) Inventors: David Lee Schmidt, Horton, AL (US); Joel Kent Schmidt, Albertville, AL (US); Joshua Lee Schmidt, Albertville, AL (US); Shawn V. Bellina, Madison, MS (US)

(73) Assignee: Spray Tech Industries, LLC, Horton, AL (US)

( * ) Notice: Subject to any disclaimer, the term of this patent is extended or adjusted under 35 U.S.C. 154(b) by 0 days.

(21) Appl. No.: 15/415,711

(22) Filed: Jan. 25, 2017

(65) Prior Publication Data

US 2018/0209149 A1 Jul. 26, 2018

Related U.S. Application Data

(60) Provisional application No. 62/286,746, filed on Jan. 25, 2016.

(51) Int. Cl.
| | |
|---|---|
| *E04D 1/00* | (2006.01) |
| *E04D 1/30* | (2006.01) |
| *E04D 1/20* | (2006.01) |
| *E04D 13/10* | (2006.01) |
| *H05B 1/02* | (2006.01) |
| *H05B 3/28* | (2006.01) |
| *B64C 39/02* | (2006.01) |
| *G08G 5/00* | (2006.01) |

(52) U.S. Cl.
CPC ............. *E04D 1/30* (2013.01); *E04D 1/20* (2013.01); *E04D 13/103* (2013.01); *H05B 1/0294* (2013.01); *H05B 3/286* (2013.01); *B64C 39/024* (2013.01); *B64C 2201/128* (2013.01); *G08G 5/0069* (2013.01)

(58) Field of Classification Search
CPC .......... E04D 1/30; E04D 13/103; E04D 1/20; H05B 1/0294; H05B 3/286; G08G 5/0069; B64C 2201/128; B64C 39/024
USPC ...................... 52/1, 518, 520, 522
See application file for complete search history.

(56) References Cited

U.S. PATENT DOCUMENTS

| | | | | |
|---|---|---|---|---|
| 3,783,570 | A * | 1/1974 | Storch | ........................ E04D 1/08 52/219 |
| 3,862,532 | A * | 1/1975 | Markos | ..................... E04D 1/08 52/521 |
| 3,899,855 | A * | 8/1975 | Gadsby | ................... E04D 1/265 264/45.1 |

(Continued)

*Primary Examiner* — Basil S Katcheves
(74) *Attorney, Agent, or Firm* — Dennen IP Law, LLC (57) ABSTRACT

A roofing system of the present disclosure has a first shingle layer and an overlaid layer a portion of which overlays the first shingle layer. Additionally, the roofing system has a first shingle in the first shingle layer, the first shingle having a first channel and a first protrusion in an upward-facing surface and the channel is contiguous with the protrusion, the channel and the protrusion formed on an interlocking end of the first shingle. Further, the roofing system has a second shingle in the overlaid layer, the second shingle having a second channel and a second protrusion in a downward-facing surface and the second channel is contiguous with the second protrusion such that the first channel is configured for receiving the second protrusion and the second channel is configured for receiving the first protrusion.

18 Claims, 8 Drawing Sheets

(56) References Cited

U.S. PATENT DOCUMENTS

| | | | | |
|---|---|---|---|---|
| 4,864,787 A | * | 9/1989 | Bukowski | E04F 13/0864 52/278 |
| 4,914,885 A | * | 4/1990 | Baker | E04D 1/16 52/520 |
| 5,581,968 A | * | 12/1996 | Laurie | E04F 13/18 52/536 |
| 5,813,184 A | * | 9/1998 | McKenna | E04D 13/103 52/518 |
| 5,878,543 A | * | 3/1999 | Mowery | E04F 13/0864 52/519 |
| 5,927,044 A | * | 7/1999 | Lamb | B29C 51/34 249/160 |
| 6,205,742 B1 | * | 3/2001 | Hahn | B28B 5/12 52/105 |
| 7,040,067 B2 | * | 5/2006 | Mowery | E04F 13/0864 52/309.8 |
| 8,136,323 B2 | * | 3/2012 | King | E04F 13/0876 52/524 |
| D780,952 S | * | 3/2017 | Mitchell | D25/139 |
| 2004/0003566 A1 | * | 1/2004 | Sicuranza | E04F 13/0864 52/518 |
| 2006/0130419 A1 | * | 6/2006 | Bowman | E04D 1/20 52/560 |
| 2009/0315720 A1 | * | 12/2009 | Clement | A61F 13/42 340/573.5 |
| 2010/0079255 A1 | * | 4/2010 | Kennedy | G06K 17/0022 340/10.4 |
| 2014/0263266 A1 | * | 9/2014 | Jenkins | E04D 13/103 219/213 |
| 2014/0330538 A1 | * | 11/2014 | Conklin | G01M 99/00 702/189 |
| 2015/0382403 A1 | * | 12/2015 | Philip | H05B 3/145 219/213 |

\* cited by examiner

ROOFING SYSTEMS AND METHODS

CROSS REFERENCE TO RELATED APPLICATION

This application claims priority to U.S. Provisional Application Ser. No. 62/286,746 entitled Foam Shingle Systems and Methods and filed on Jan. 25, 2016, which is incorporated herein by reference in its entirety.

BACKGROUND

The roof of a building is the upper structure of the systems providing a variety of structural functions. The roof structures outer layer is composed of a variety of modular materials that overlay or interlock. The purpose of the outer layer (roof) is to protect the interior of the building from harmful weather and damaging effect from the sun.

Roofing materials are typically chosen based on local weather conditions, availability of local resources and the ease of installation. This is why often materials as varied as thatch and ceramic tile are used throughout the world. Metal, slate, and asphalt are the most common modern roof materials. Of the three, asphalt is the most widely used residential roof material due to the relatively low cost of petrochemical used in its construction and ease of installation.

Energy efficiency is the measure of a system to do the same amount of work with less work and is often confused with energy conservation. Over the course of time materials have been engineered to provider greater energy efficiency. One efficiency metric that is widely used is thermal resistance, commonly call R or R value. Thermal resistance (R) is the capacity of a material to resist heat flow. The greater the R value the greater the efficiency of the given material. Wood shingles for example have an R value of 0.97, whereas asphalt shingles have an R value of 0.44. Another important metric with respect to roof material is the solar reflectance Index (SRI). SRI is the measure of the ability of a given material to reflect solar energy from its surface back into the atmosphere. SRI is particularly important in warm climates and climate that have high solar exposure. Consider together R and SRI values are good measures to evaluate performance of a material in given condition one measures transmission while the other measures load.

Modern asphalt energy efficient shingles are commonly composite tiles that incorporate fiberglass and reflective granular materials. While these materials are more energy efficient they are typically more expensive and require the old roof tile to be removed before installing the new roof tile. Considering the functional requirements roofs must meet, varied environmental conditions (cold-warm), varied solar conditions, low cost, ease of installation and energy efficiency asphalt roof are a good solution. However, improvements can be made.

Polyurethane foam is a versatile material that can be molded, sprayed and poured. It can be formulated to achieve a wide range of structural, insulating and acoustic applications. Closed cell polyurethane foam is widely used as an insulating building material. The material in inert when cured and emits low volatile organic compounds. Polyurethane foam is formed by chemical reaction of typically, methylene diphenyl diisocyanate and polymeric methylene diphenyl diisocyanate commonly referred to as the A side and typically a blend of polyols and other agents that give performance characteristics commonly referred to as the B side. Given the wide range of structural and insulating properties of polyurethane foam with its ability to be molded it is a good candidate material for a modular roof tile substrate.

Polyurea elastomer and polyurethane copolymers are used in a variety of coating applications and have very good tensile, shear and elongation strength. They perform in thermal extremes and can be blended with materials that have very high SRI values. Additionally, low cost polyurea have been created that have self-healing properties.

Glass microspheres are low density additives used in paint that have been shown to have 80-86% SRI in elastomeric paint.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3B is a cross-section view of an interlocking formation of the shingle roofing system of FIG. a.

SUMMARY

In some embodiments a roofing system of the present disclosure is comprised of a polyurethane foam core that is shaped into a continuous interlocking tile system. The polyurethane foam core is rigged with embedded polythene/ethylene vinyl acetate strips that act as nailing scaffolds and seals. In some embodiments, electronic devices are embedded within the foam core such as heating elements to melt ice. In some embodiments, electronic sensors are embedded within the foam core each tile acting as a node and each tile connecting to adjacent tiles to form a network of sensors that detect the surface area of the roof. The polyurethane foam core is coated with a polyurea elastomer or poly urea elastomer and polyurethane copolymers skin. In some embodiments the polyurea elastomer or poly urea elastomer and polyurethane copolymers skin contains additive of glass microspheres.

The polyurethane foam core shaped into a continuous interlocking is the substrate of a roof system of the present disclosure. The continuous interlocking modules may be scaled to accommodate modulus of the building envelope. Additionally, the polyurethane foam core surface may be shaped to produce a desirable aesthetic or functional design pattern. For example, the tile may be designed to resemble a wood shingle roof. The density of the foam may be altered for a given application, increasing the weight of the foam will provide added structure to the tile. For instance, if the tile is expected to carry a heavy ice or snow load, the weight of the foam may be increased to provide additional structure.

The characteristics of the foam cell may be altered by changing the formulation of the B side of the polyurethane component to alter total weight and or add additional thermal or acoustic barriers through increased air space in the foam substrate.

The polyurethane foam core has an embedded polyethylene/ethylene vinyl acetate nail strips that are molded into the substrate of the foam core. The polyethylene/ethylene vinyl acetate nail strips may ran length or width of the tile depending on the application and may be spaced at intervals determined by a given application. The polyethylene/ethylene vinyl acetate nail strip adds a structural batten to the tile. When the tile is fixed with a nail the friction of the nail melts the polyethylene/ethylene vinyl acetate nail strip fusing the polyethylene to the nail creating a moisture barrier.

In some embodiments, the polyurethane foam core may contain one or more electric or electronic devices based on the application. In case of electric devices the polyurethane foam core may contain contacts and wiring so that one or more adjacent tiles will form a circuit. Electric devices such as heating elements used to melt ice build-up on roof eves in cold may be embedded into the polyurethane foam core and attached to the electric circuit.

In case of electronic devices the polyurethane foam core may contain contacts and wiring so that one at one or more adjacent tiles will form a network. Electronic devices such as sensors used to monitor ambient weather conditions may be embedded into the poly urethane foam core and attached to the network.

In some embodiments, the polyurethane foam core is covered with a polyurea elastomer or polyurea elastomer and polyurethane copolymers skin based on the application. For instance in applications that require great impact protect, from hail for example, polyurea elastomer and polyurethane copolymers may be a better choice.

The polyurea elastomer or polyurea elastomer and polyurethane copolymers skin may contain one or more additive based on the application and the desired aesthetics. For example colorants may be used to produce a desired color based on the application. Glass microsphere in addition may be added for some applications. For example in warm climates glass microsphere increase the roof tile's ability to reflect solar radiation back into the atmosphere reducing the thermal gain of the tile.

DETAILED DESCRIPTION

Figure 1:
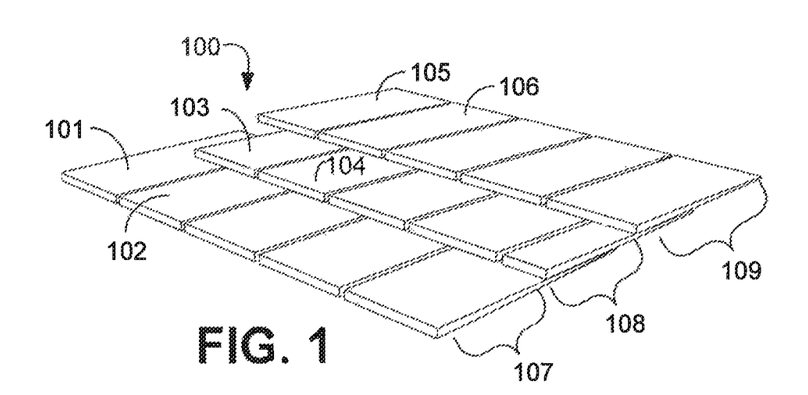
FIG. 1 is an exemplary roofing system in accordance with an embodiment of the present disclosure.

FIG. 1 depicts an exemplary roofing system 100 in accordance with an embodiment of the present disclosure. The roofing system 100 comprises a plurality of shingle layers 107-109. Note that only three shingle layers 107-109 are shown for exemplary purposes. More or fewer shingle layers 107-109 may be present in other embodiments of the disclosure.

In one embodiment, each shingle in the system 100 comprises an internal foam layer (not shown). The foam layer of each shingle is coated with a weather-resistant material. For example, the foam layer may be coated with polyurethanes and hybrid polyurea/polyurethanes. In one embodiment, the coating may contain glass microspheres that my reflect light, thereby reducing the heat to be absorbed by the system 100.

Each shingle layer 107-109 comprises a plurality of interlocking shingles 101, 102; 103, 104; and 105, 106, respectively. Note that only six (6) shingles are identified with reference numerals for simplicity of discussion.

In one embodiment, shingles from each layer 107 and 108 interlock with and couple to at least one shingle of an overlaid layer 108 and 109, respectively. Note that the term "overlaid" refers to a shingle layer 108 or 109 that is adjacent to and a portion of which overlays a previous shingle layer 107 or 108, respectively. A layer that overlays a layer may be referred to herein as a "subsequent layer," and the layer over which the overlaid layer extends may be referred to as a "previous layer."

In the exemplary system 100 depicted, shingles 101 and 102 of layer 107 interlock with and couple to shingle 103 of layer 108. Additionally, a portion of shingle 102 of layer 107 also interlocks with and couples to shingle 104 in the overlaid layer 108. Further, a portion of shingle 103 of layer 108 interlocks with and couples to shingle 105 of overlaid layer 109. Additionally, shingles 103 and 104 of layer 108 interlock with and couple to shingle 106.

In the embodiment depicted, each shingle of a layer 107-109 is centrally offset from a shingle in a subsequent overlaid layer 107-109. In this regard, portions of two shingles from one layer 107-108 interlock with and couple to a single shingle in the overlaid layer 107-109. Note that the interlocking formation shown in FIG. 1 is exemplary only. In other embodiments of the system 100, the shingles may interlock with and couple to the shingles of an adjacent layer 107-109 in a different formation. For example, a shingle 101 from layer 107 may be aligned with a shingle 103 from the adjacent layer 108. The formation depicted in FIG. 1 is not intended to be limiting.

Figure 2:
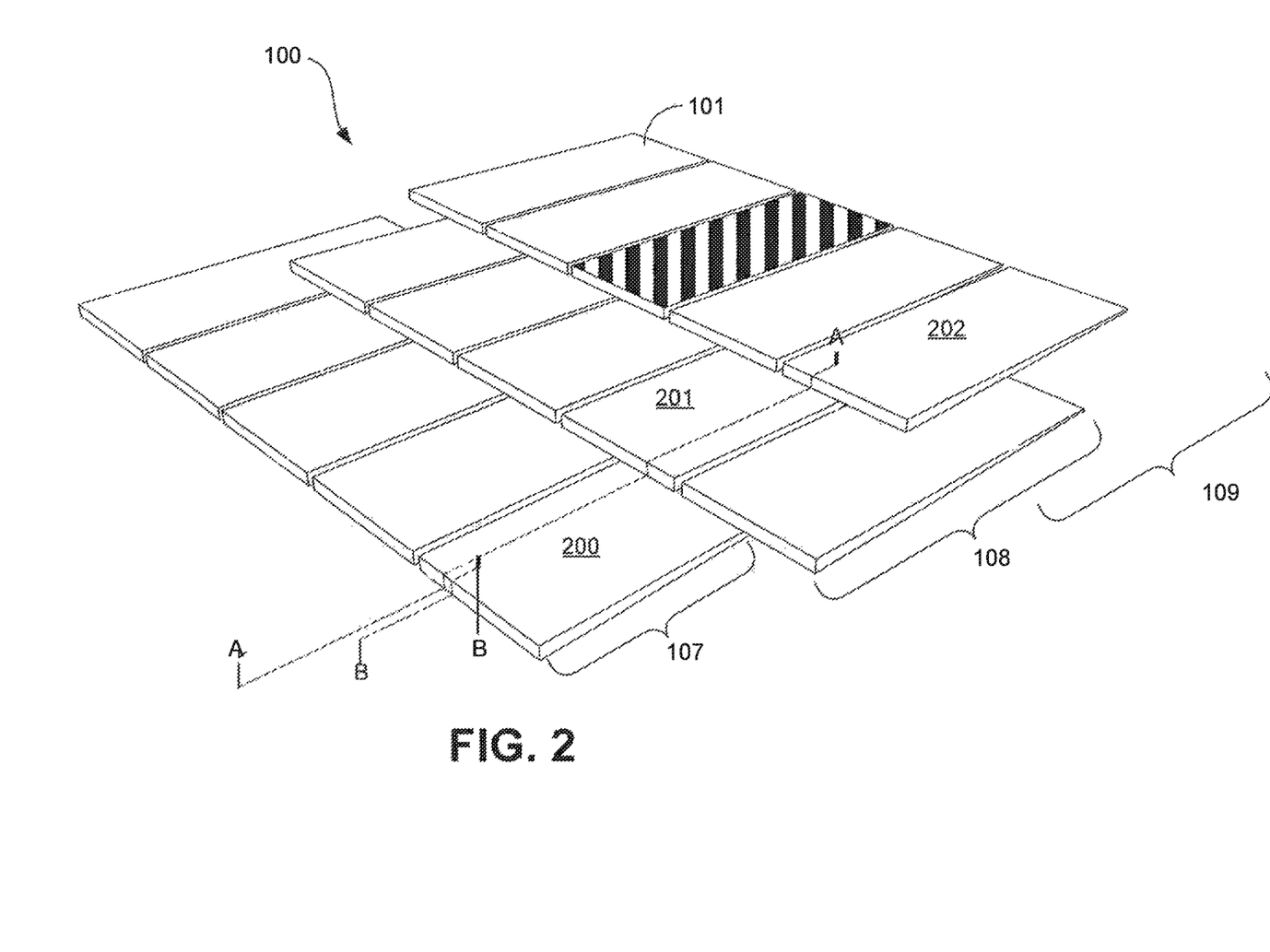
FIG. 2 is the shingle roofing system of FIG. 1.

FIG. 2 depicts the foam shingle system 100 such as is depicted in FIG. 1. As described hereinabove, each layer 107-109 comprises a plurality of shingles. For purposes of discussion, shingle 200 in layer 107, shingle 201 in layer 108 and shingle 202 in layer 109 are numbered for simplicity of description.

In the system 100, a portion of shingle 200 interlocks with and couples to a portion of shingle 201 of overlaid layer 108. Further, a portion of shingle 201 interlocks with and couples to a portion of shingle 202 in overlaid layer 109. Further referenced in FIG. 2 is a cross-sectional identifier A-A, which is depicted in FIG. 3, and a cross-sectional identifier B-B, which is depicted in FIG. 6.

Figure 3A:
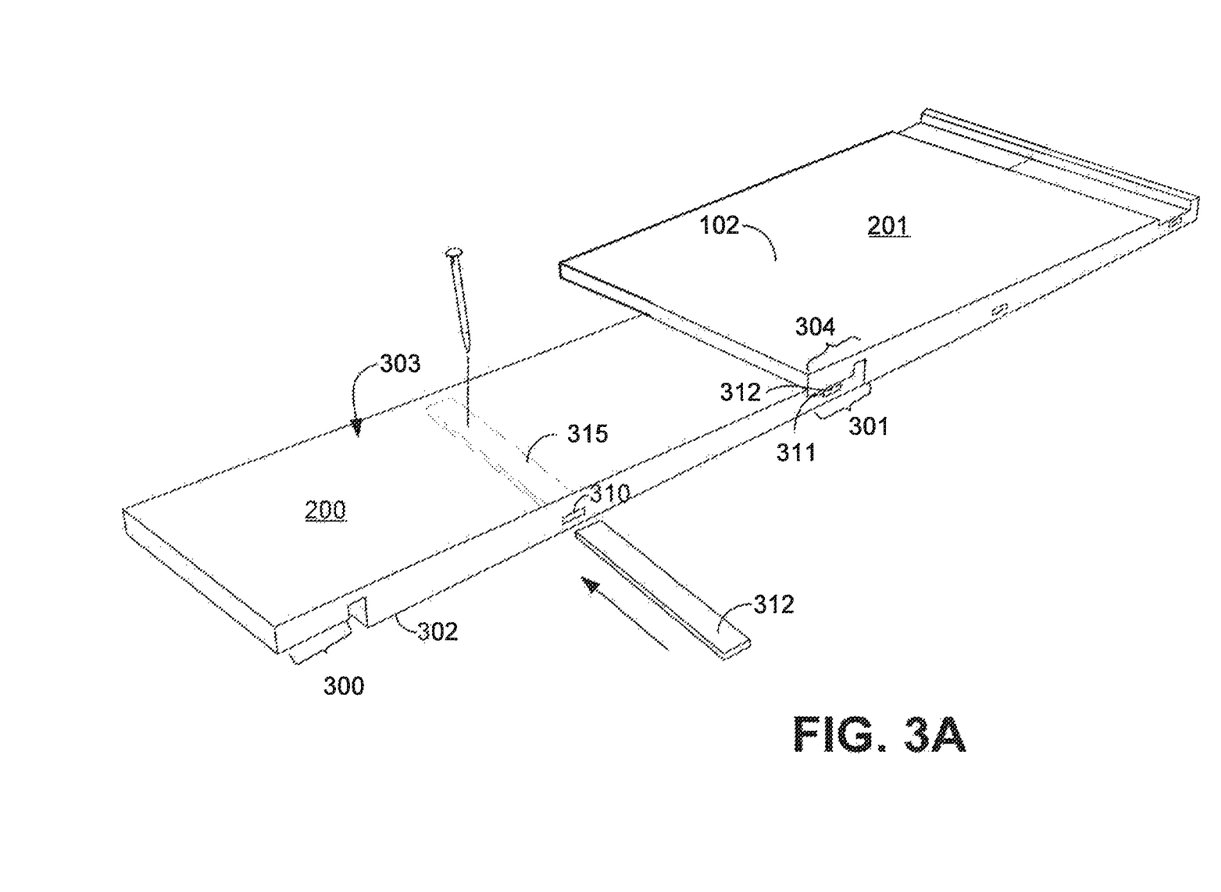
FIG. 3A is a cross-sectional view of the shingle roofing system of FIG. 1.

FIG. 3A depicts a cross-sectional view of a portion of the system 100 taken along line A-A of FIG. 2. The cross-sectional view of FIG. 3A shows shingle 200 of previous layer 107 (FIG. 2) interlocked with and coupled to shingle 201 of overlaid layer 108 (FIG. 2).

Each shingle 200 and 201 comprises two interlocking ends. For purposes of description, interlocking ends 300 and 301 are described with reference to shingle 200; however, in one embodiment, the interlocking ends of shingle 201 are identical to the interlocking ends 300 and 301. Thus, the description of the interlocking ends 300 and 301 is also applicable to the interlocking ends of shingle 201. Note that interlocking end 304 is identified with reference to FIG. 3A but is described further with reference to FIG. 3B.

One interlocking end 300 is formed in a bottom surface 302 of the shingle 200. This interlocking end 300 is hereinafter referred to as the "downward-facing interlocking end 300." The opposing interlocking end 301 is formed in a top surface 303 of the shingle 200. This interlocking end 301 is hereinafter referred to as the "upward-facing interlocking end 301."

Note that in one embodiment, every shingle shown in the system 100 (FIG. 1 and FIG. 2) comprises a downward-facing interlocking end and an upward-facing interlocking end. Further note that for each of the shingles, the upward-facing interlocking end of each shingle interlocks with and couples to the downward-facing interlocking end of another shingle. In this regard, as described with reference to FIG. 1, the shingles of the system 100 are installed in layers 107-109 (FIG. 1) such that each upward-facing interlocking end of each shingle mates with, interlocks with, and couples to the downward-facing end of a shingle in the subsequent layer.

The shingle 200 further comprises openings 310 and 311. The openings 310 and 311 provide access to slots formed in the shingle 200. Note that opening 310 provides access to a slot 315 that traverses the width of the shingle 200. Opening 311 provides access to a slot (not shown) similar to slot 315 that traverses the width of the shingle 200.

The slot 315 and the slot not specifically shown are for receiving nail strips. In FIG. 3A, the slot 315 is adapted and arranged for receiving a nail strip 312. In regards to the slot (not shown) corresponding to an opening 311, a nail strip 313 is inserted within through the opening 311.

The nail strip 312 is inserted into the shingle 200, which provides a structure to support the shingle 200. In one embodiment, the slot 315 receives only a portion of the nail strip 312 so that a portion of the nail strip 312 extends from the shingle 200. The portion extending from the shingle 200 may be inserted into a slot (not shown) in an adjacent shingle (not shown).

Figure 3B:
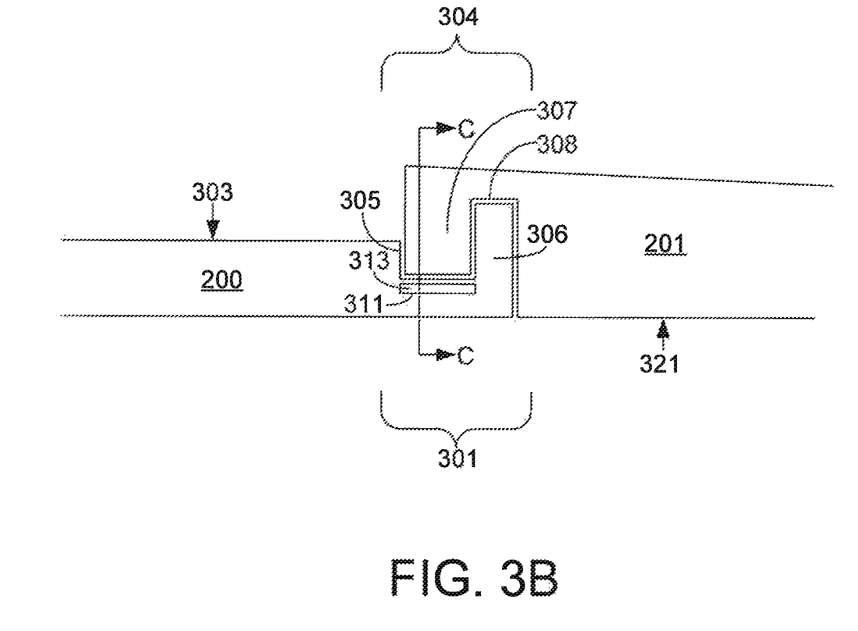
Figure 3C:
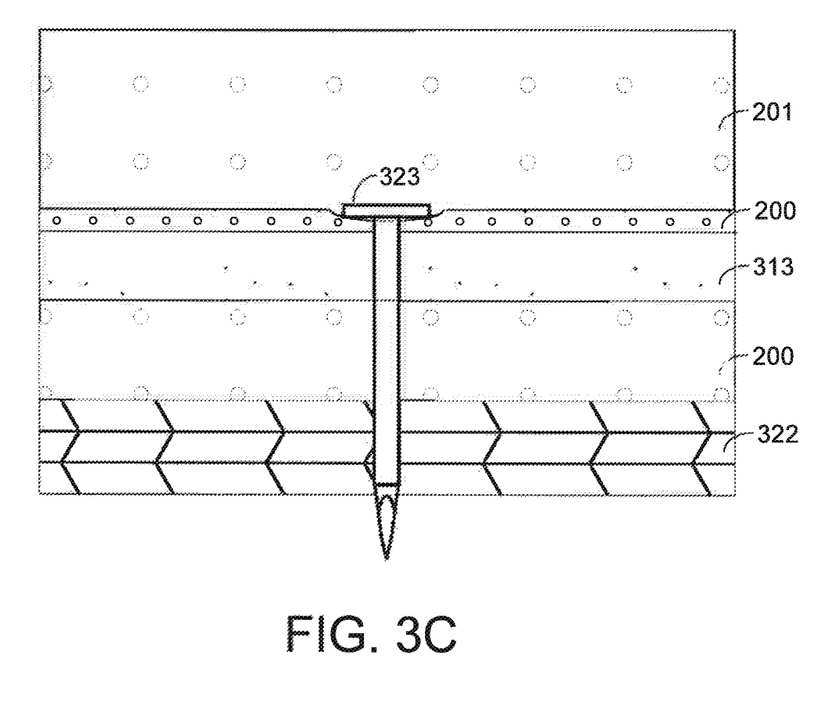
FIG. 3C is a cross-sectional view of a fastening system for the roofing system of FIG. 1.

The nail strip 312 inserted into the shingle 200 receives fasteners, e.g., nails, that couples the shingle 201 to the shingle 200, which is described further with reference to FIG. 3C. Note that other types of fasteners are possible in other embodiments.

In one embodiment, the nail strips 312 and 313 are composed of a self-healing polyethylene/ethylene vinyl. In such an embodiment, when a nail (shown in FIG. 3C) is installed through the nail strip 312, the friction created between the nail (shown in FIG. 3B) and the nail strip 312 creates heat that melts the polyethylene/ethylene vinyl around the nail forming a watertight seal. In one embodiment, the density and placement of the nail strip 312 is adapted and arranged to work with nail guns at a range of PSI and standard roofing nail weights.

FIG. 3B is a cross-sectional side view of the downward facing interlocking end 304 of shingle 201 mated and interlocked with the upward facing interlocking end 301 of shingle 200. Note that as described hereinabove, each of the shingles of the system 100 (FIG. 1 and FIG. 2) would comprise both an upward facing interlocking end and a downward facing interlocking ends.

The upward-facing interlocking end 301 comprises a channel 305 formed in the upward-facing surface 303 and at an interlocking end of shingle 200. In one embodiment, the channel 305 traverses the width of the shingle 200. The upward-facing interlocking end 301 further comprises a protrusion 306. The protrusion 306 is contiguous with the channel 305. In one embodiment, the protrusion 306 extends a distance above the surface 303 of the shingle 200.

The downward-facing interlocking end 304 comprises a channel 308 formed in a downward-facing surface 321 of the shingle 201. In one embodiment, the channel 308 traverses the width of shingle 201. The downward-facing interlocking end 304 further comprises a protrusion 307. The protrusion 307 is contiguous with the channel 308. In one embodiment, the protrusion 307 does not extend past the bottom, surface 321 of the shingle 201.

Prior to interlocking the shingle 200 with the shingle 201, the shingle 200 is fastened to a roofing substrate, as described further with reference to FIG. 3C. The shingles 200 and 201 are then interlocked. In regards to interlocking of the shingle 200 with the shingle 200, the channel 305 of the shingle 200 receives the protrusion 307 of the shingle 201. Further, the channel 308 of the shingle 201 receives the protrusion 306 of the shingle 200.

FIG. 3C depicts a cross sectional view taken along line C-C of FIG. 3B. In this regard, a nail 323 is inserted into the shingle 200. In this regard, when installed, the nail 323 pierces a portion of the shingle 200, the nail strip 313, another portion of the shingle 200, and a roofing substrate. As described hereinabove, the nail strip 313 may be shelf-healing polyethylene or ethylene vinyl. The nail 323 couples the shingle 200 to the roofing substrate 322. In one embodiment, a plurality of nails (not shown) is installed at different locations along the nail strip 313 in order to secure the shingle 200 to the roofing substrate 322.

Figure 4A:
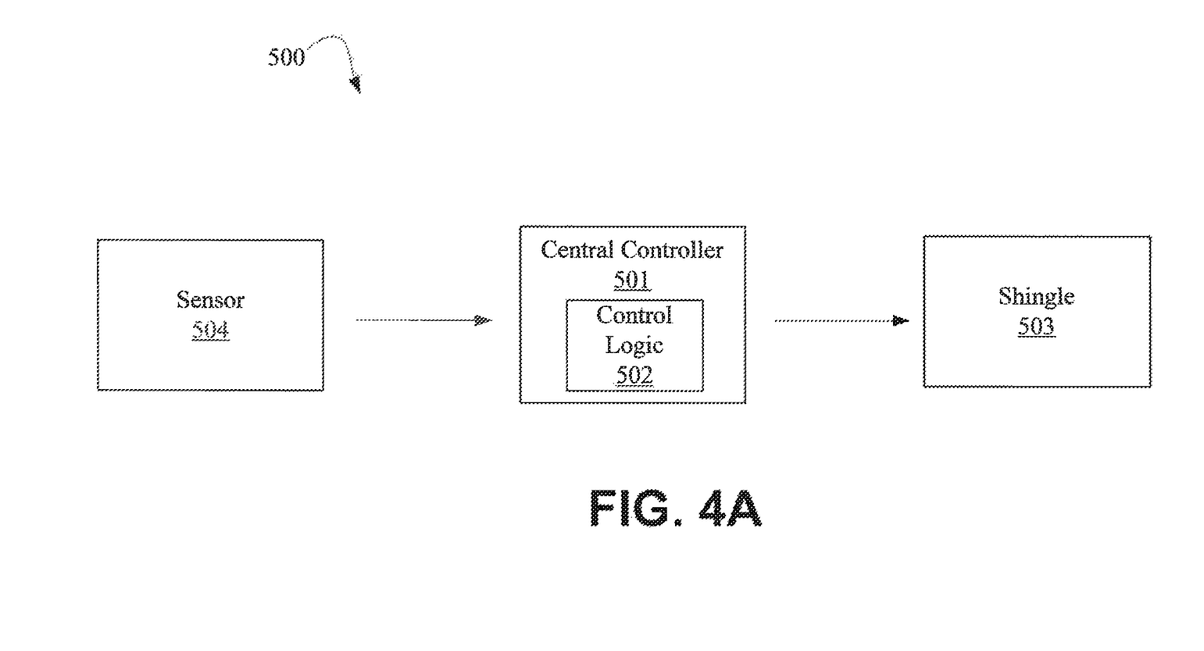
FIG. 4A is an exemplary roofing system as depicted in FIG. 1.

FIG. 4A depicts a block diagram of a roofing system 500 that comprises a shingle 503 substantially similar to those shingles described hereinabove with reference to FIGS. 1-3B. Additionally, the system 500 comprises a central controller 501 and a sensor 504. The central controller 501 further comprises control logic 502. The control logic 502 may be hardware, software, or any combination thereof.

The sensor 504 is configured for detecting an environmental parameter, e.g., temperature. The sensor 504 is communicatively coupled to the central controller 510. Further, the central controller 510 is communicatively or electrically coupled to the shingle 503.

In one embodiment, the sensor 504 detects an ambient temperature. In such an embodiment, the control logic 502 receives data indicative of the temperature. The control logic 502 determines whether the ambient temperature is below a threshold value, e.g., 0° C. If the ambient temperature is below the threshold value, the control logic 502 transmits data to a microcontroller coupled to a heating element in the shingle 503 to activate the heating element.

Figure 4B:
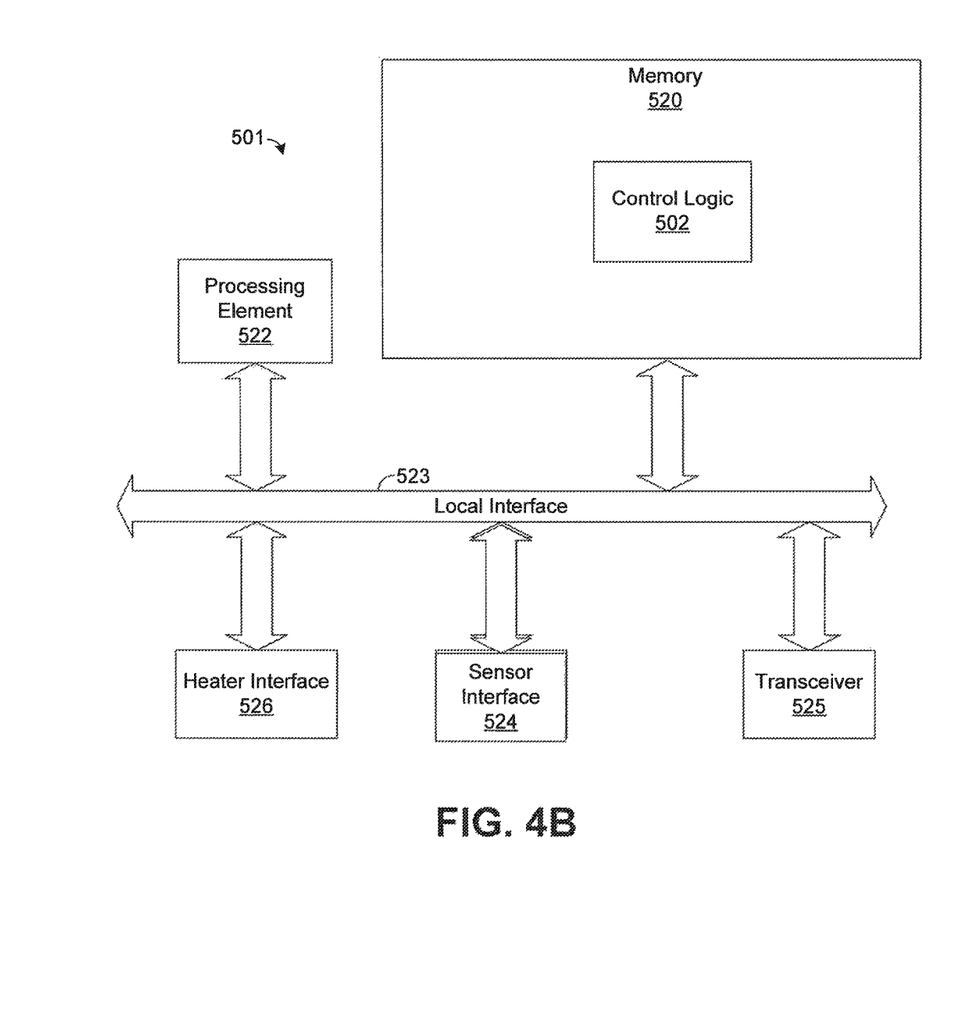
FIG. 4B is a block diagram of an exemplary central controller such as is depicted in FIG. 4A.

FIG. 4B depicts an exemplary embodiment of the central controller 501 depicted in FIG. 4A. As shown by FIG. 4B, the central controller 501 comprises a processing element 522, a sensor interface 524, and a network interface 525. Additionally, the central controller 501 comprises control logic 502 stored in memory 300.

The control logic 502 generally controls the functionality of the central controller 501, as will be described in more detail hereafter. It should be noted that the control logic 502 can be implemented in software, hardware, firmware or any combination thereof. In an exemplary embodiment illustrated in FIG. 4B, the control logic 502 is implemented in software and stored in memory 300.

Note that the control logic 502, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the central controller 501 depicted by FIG. 4B comprises the at least one conventional processing element 522, such as a digital signal processor (DSP) or a central processing unit (CPU), that communicates to and drives the other elements within the central controller 501 via a local interface 523, which can include at least one bus. Further, the processing element 522 is configured to execute instructions of software, such as the analytics logic 308.

The sensor interface 524 is any type of interface that can receive data from the sensor 504. In the example above, the sensor 504 is a temperature sensor. In such an embodiment, the sensor 504 measures temperature and transmits data to the central controller 501 indicative of the temperature, which is received by the sensor interface 524.

The transceiver 525 is any type of device that can transmit and receive data. In this regard, the transceiver may be communicatively coupled to a microprocessor (not shown) on the shingle 503. In such an embodiment, the transceiver 525 may transmit data indicating that a heating element is to be turned on.

In one embodiment, the heating element may be directly electrically coupled to the central controller 501 via a heater interface 526. In such an embodiment, the control logic 526 transmits data to the heating element to activate the heating element.

Figure 5:
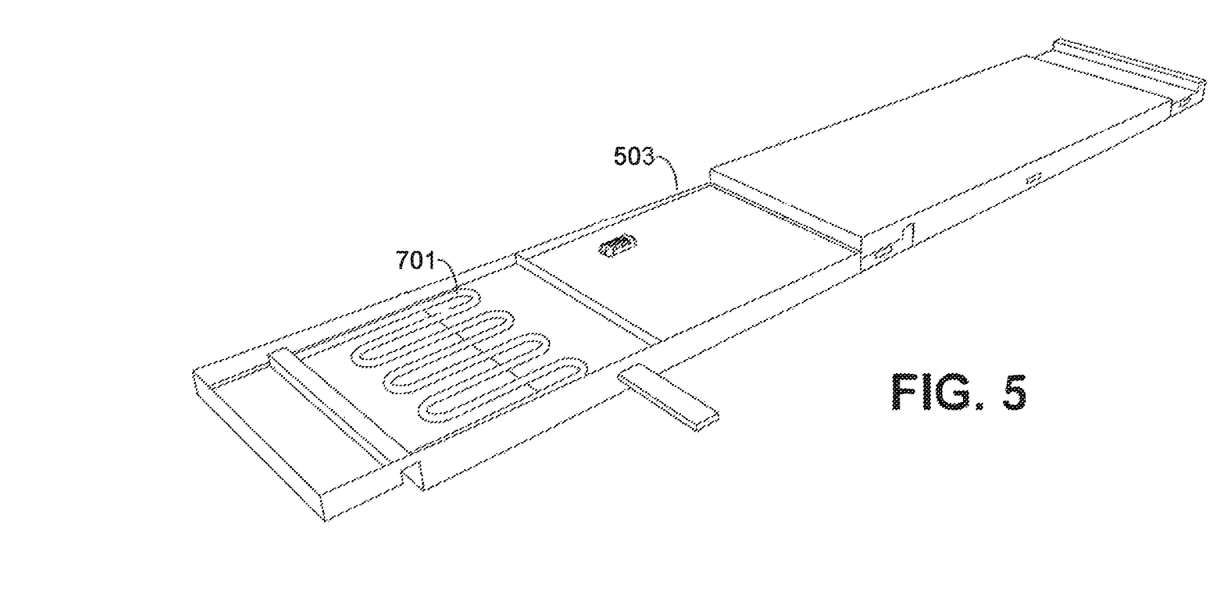
FIG. 5 is an exemplary shingle for the roofing system of FIG. 1 having a heating element and a microprocessor.

An exemplary shingle 503 in accordance with an embodiment of the present disclosure is depicted in FIG. 5. FIG. 5 shows a cutaway view of the shingle 503. In this regard, embedded within the shingle 503 may be a heating element 701. Additionally, the shingle 503 may comprise a microcontroller 703. Each of these features is described further herein.

In one embodiment, the heating element 701 may be activated by the central controller 501 (FIGS. 4A and 4B) based upon a temperature reading of the ambient temperature. When activated, the heating element 701 may prevent ice from forming on the shingle 503 or may melt ice on the shingle 503 that has already formed.

The microcontroller 703 may comprise sensors (not shown), a processor (not shown), and/or a transceiver (not shown). Note that in one embodiment each shingle of system 100 (FIG. 1 and FIG. 2) may comprise its own microcontroller 703 or the system 100 may comprise only a single microcontroller 703 for the entire system 100 in other embodiments.

As an example, the microcontroller 703 may comprise a temperature sensor (not shown). In response to a reading indicating that the ambient temperature is below freezing, the processor may activate the heating element 701 in order to prevent ice from forming on the shingle 503 or melt ice that has already formed on the shingle 503.

Other types of sensors may be included on the microcontroller 703 in other embodiments. For example, there may be an atmospheric pressure sensor or a humidity sensor. Reading from these types of sensors may be used by the processor in order to control the heating element 701 among other functionalities.

The transceiver (not shown) may be used for numerous purposes. For example, the transceiver may communicate with other microcontrollers coupled to other shingles of the system 100 in order to control other heating elements. In this regard, the transceivers of the microcontrollers 703 may be used to create a wireless area network (WAN) of the plurality of microcontrollers.

The transceiver (not shown) may also be configured to transmit and receive data wirelessly from other devices. As an example, the transceiver may be configured to transmit a homing signal for guiding airborne vehicles. In such an example, the airborne vehicle may be a drone that comprises a package that is to be delivered to the house on which the roofing system is installed. The transceiver may transmit the homing signal that guides the drone to the house to deliver a package.

The invention claimed is:

1. A roofing system, comprising:
a first shingle layer comprising a first plurality of shingles;
a second shingle layer comprising a second plurality of shingles wherein each of the second plurality of shingles has a portion of which that overlays a portion of one the first plurality of shingles;
a first shingle in the first shingle layer, the first shingle having a single first rectangular channel and a single first rectangular protrusion in an upward-facing surface and the first rectangular-channel is contiguous with the first rectangular protrusion, the first rectangular channel and the first rectangular protrusion formed on an interlocking end of the first shingle, the first shingle comprising a slot that traverses the first shingle and the slot is configured to traverse the shingle underneath the first rectangular channel;
a second shingle in the second shingle layer, the second shingle having a single second rectangular channel and a single second rectangular protrusion in a downward-facing surface and the second rectangular channel is contiguous with the second rectangular protrusion such that the first rectangular channel is configured for receiving the second rectangular protrusion and the second rectangular channel is configured for receiving the first rectangular protrusion wherein the first rectangular protrusion is dimensioned such that it extends a distance above an upward surface of the second shingle,
wherein when interlocking the first shingle and the second shingle, a fastener is inserted through the first shingle, the second shingle, a nail strip inserted within the slot, another portion of the second shingle, and through a roofing substrate, and wherein the first shingle is flush with the second shingle so that such at a bottom of the first shingle and the bottom of the second shingle are fully attached to the roofing substrate and no opening exist between the shingles and the roofing substrate.

2. The roofing system of claim 1, wherein the second shingle comprises a slot configured for receiving a nail strip.

3. The roofing system of claim 2, wherein the nail strip is comprised of a self-healing substance.

4. The roofing system of claim 1, wherein the first shingle channel extends a width of the first shingle.

5. The roofing system of claim 1, wherein the first shingle is configured for interlocking with the second shingle such that only a portion of the second shingle is atop a portion of the first shingle.

6. The roofing system of claim 1, wherein the second protrusion is configured so that it does not extend beyond the downward-facing surface.

7. The roofing system of claim 1, wherein a heating element is disposed within at least one of the first or second shingle.

8. The roofing system of claim 1, further comprising a central controller.

9. The roofing system of claim 8, wherein the central controller is configured for receiving an ambient temperature reading.

10. The rooting system of claim 9, wherein the first shingle comprises a heating element.

11. The roofing system of claim 10, wherein the central controller is configured to control the heating element.

12. The roofing system of claim 1, farther comprising a microcontroller coupled to the first shingle.

13. The roofing system of claim 12, wherein the microcontroller is electrically coupled to a heating element, and the microcontroller is configured to activate the heating element based upon data received from a central controller.

14. The roofing system of claim 1, wherein the first shingle comprises a homing device.

15. The roofing system of claim 14, wherein the homing device transmits data indicative of a location of a residence or business that comprises the first shingle.

16. The roofing system of claim 15, wherein the homing device is configured to guide an airborne vehicle to the location of the residence or business.

17. The roofing system of claim 1, wherein the first shingle comprises a foam core.

18. The roofing system of claim 17, wherein the foam core is coated with a weather-resistant material.

\* \* \* \* \*